US012571236B2

(12) United States Patent
Erickson et al.

(10) Patent No.: US 12,571,236 B2
(45) Date of Patent: Mar. 10, 2026

(54) KEY RETENTION SYSTEM FOR PRODUCT PACKAGING WITH RETAINING EAR CLOSED RELIEF SLOT

(71) Applicant: SEE Forming L.L.C., Appleton, WI (US)

(72) Inventors: Mark Allan Erickson, Appleton, WI (US); Scott James Sadowski, Trevor, WI (US); Muzammil Hussain, Eagan, MN (US)

(73) Assignee: SEE Forming L.L.C., Appleton, WI (US)

( * ) Notice: Subject to any disclaimer, the term of this patent is extended or adjusted under 35 U.S.C. 154(b) by 74 days.

(21) Appl. No.: 18/420,665

(22) Filed: Jan. 23, 2024

(65) Prior Publication Data

US 2025/0237087 A1 Jul. 24, 2025

(51) Int. Cl.
*E05B 73/00* (2006.01)

(52) U.S. Cl.
CPC ................................ *E05B 73/0023* (2013.01)

(58) Field of Classification Search
CPC ............. E05B 73/0017; E05B 73/0023; E05B 73/0029; E05B 73/0035; E05B 73/0041
See application file for complete search history.

(56) References Cited

U.S. PATENT DOCUMENTS 774,037 A 11/1904 Burgi
2,720,969 A 10/1955 Kendall
3,933,240 A 1/1976 Humble
3,983,996 A 10/1976 Hendren, III
4,019,633 A 4/1977 Roth
4,697,703 A 10/1987 Will
4,938,355 A 7/1990 Rocco
5,386,908 A 2/1995 Sinn
5,501,341 A 3/1996 Van Es
5,526,926 A 6/1996 Deja
5,590,768 A 1/1997 Hilton et al.
5,601,189 A 2/1997 Roshdy
5,772,031 A 6/1998 Landis
5,823,341 A * 10/1998 Nakasuji ............. E05B 73/0023
6,047,826 A 4/2000 Kalinski et al.
6,123,192 A 9/2000 Rufo, Jr.
6,164,446 A 12/2000 Law
6,196,388 B1 3/2001 Kaposvari
6,216,885 B1 4/2001 Guillaume
D442,697 S 5/2001 Hajianpour
6,276,033 B1 * 8/2001 Johnson .............. E05B 73/0035 24/3.1
6,299,039 B1 * 10/2001 Hsu .................... A47G 25/1407 223/87
6,412,631 B2 7/2002 Belden, Jr.
6,443,300 B1 9/2002 Gelardi
6,527,115 B2 3/2003 Rabiner et al.
6,547,068 B2 4/2003 Chu
(Continued)

FOREIGN PATENT DOCUMENTS

EP 2206480 A1 7/2010
WO 2015080578 A1 6/2015

*Primary Examiner* — Christopher J Boswell
(74) *Attorney, Agent, or Firm* — Gray Ice Higdon

(57) ABSTRACT

A package for a product, a key retention system, and a retaining key utilize a closed relief slot in the retaining key to enable flexure of a retaining car on the retaining key during movement of the retaining key between locked and released configurations.

20 Claims, 11 Drawing Sheets

(56) References Cited

U.S. PATENT DOCUMENTS 6,588,587 B2 7/2003 Johnson et al.
6,839,239 B1 1/2005 Lee
6,892,878 B2 5/2005 Hegarty et al.
6,892,881 B2 5/2005 Leitch
6,915,901 B2 7/2005 Feinberg et al.
6,955,068 B2 10/2005 Gelardi
7,404,484 B2 * 7/2008 Farrar ................. E05B 73/0023
70/57.1
7,527,148 B2 5/2009 Crouan
7,987,977 B2 8/2011 Leedom et al.
8,109,480 B2 2/2012 Lee et al.
8,657,106 B2 2/2014 Trapp et al.
8,727,117 B2 5/2014 Maasarani
9,265,578 B2 2/2016 Dacey
9,687,300 B2 6/2017 Hartfelder et al.
10,577,165 B2 3/2020 Sadowski et al.
11,142,930 B2 * 10/2021 Strassburger ....... E05B 73/0005
11,274,473 B2 * 3/2022 Jevens ................ E05B 73/0017
2002/0100701 A1 8/2002 Chiu
2003/0000855 A1 1/2003 Lin
2003/0121821 A1 7/2003 Roshdy
2004/0007482 A1 1/2004 Wen-Long
2004/0217249 A1 * 11/2004 Eisenbraun ........... A47F 5/0006
248/323
2005/0098460 A1 5/2005 Smith et al.
2007/0029216 A1 2/2007 Liu
2007/0193313 A1 * 8/2007 Tsai .................... E05B 73/0017
70/57.1
2011/0315565 A1 12/2011 Chiappini
2012/0247988 A1 10/2012 Lax et al.
2013/0091905 A1 * 4/2013 Brown ................ E05B 73/0017
29/428
2015/0224247 A1 8/2015 McDorman et al.
2016/0206510 A1 7/2016 Carrel et al.
2016/0354151 A1 12/2016 Nadig et al.
2018/0311027 A1 11/2018 Distefano
2018/0370667 A1 12/2018 Bogdziewicz et al.
2019/0092547 A1 3/2019 Sadowski et al.

* cited by examiner

KEY RETENTION SYSTEM FOR PRODUCT PACKAGING WITH RETAINING EAR CLOSED RELIEF SLOT

BACKGROUND

Conventionally, products have been packaged in a variety of ways, many of which present various limitations, including difficulty for an end user to insert the product within the package and/or to release the product without damage or loss to the contained products. An example of conventional packaging includes packaging molded or thermoformed into a rigid or semi-rigid plastic container for holding one or more products in one or more predetermined locations in the container. Another conventional type of packaging includes a flexible pouch into which product components may be inserted. In some instances, these packaging techniques may be combined. Containing products within a tray, pouch, or the like may also be supplemented by additional elements such as covers, straps, adhesive tape, or the like. The use of such additional elements, however, may not be desirable and may be cumbersome to the end user.

In particular, many packaging systems are subject to the competing desires of securely retaining and protecting products within packages during shipment and otherwise prior to use, and of enabling retained products to be quickly and easily removed from the packaging when needed. With some medical equipment, for example, it may be desirable to securely retain delicate and sterilized instruments used in medical procedures within a package for shipment and storage, yet enable those instruments to be removed as quickly and effortlessly as possible during the medical procedures.

Further, environmental concerns remain an important concern in the packaging industry, so it is also desirable to minimize waste associated with packaging systems both in connection with the manufacture of packaging and its disposal and/or recycling after use.

In addition, it has been found that, for example, with packaging systems using thermoformed container bodies, manufacturing and other variations in the container bodies may present issues with respect to friction fit components, such that, in some instances, it may be difficult for a user to manipulate movable components due to excessive friction, but only on some units.

SUMMARY

The herein-described embodiments address these and other problems associated with the art by providing a package for a product, a key retention system, and a retaining key that utilize a closed relief slot in the retaining key to enable flexure of a retaining car on the retaining key during movement of the retaining key between locked and released configurations, thereby reducing the impact of manufacturing and other variations on the frictional resistance of the retaining key when moving within a channel of a key support of the key retention system.

Therefore, consistent with one aspect of the invention, a package for a product may include a container body configured to support the product and including a key support, the key support including first and second walls defining a channel, and a retaining key supported by the key support and extending through the channel. The retaining key is configured for movement along a longitudinal axis between locked and released configurations, and in the locked configuration the retaining key retains a portion of the product when the product is supported by the container body and in the released configuration the retaining key is retracted to facilitate removal of the product from the container body when the product is supported thereby. The retaining key includes a retaining car extending generally transverse to the longitudinal axis and configured to frictionally engage the first wall of the key support within the channel during at least a portion of the movement of the retaining key between the locked and released configurations, and a closed relief slot formed in the retaining key adjacent to the retaining car and configured to enable flexure of the retaining car during the at least a portion of the movement of the retaining key between the locked and released configurations.

In some embodiments, the retaining key includes a tab portion including first and second ends and the retaining car is disposed on the tab portion intermediate the first and second ends thereof, and the first end of the tab portion is configured to extend over the portion of the product when the retaining key is in the locked configuration. Also, in some embodiments, the retaining key further includes an anchor portion and a deformable portion extending between the tab portion and the anchor portion, the deformable portion is configured to be suspended over a void defined by the key support when the retaining key is supported by the key support, the anchor portion is configured to anchor the retaining key to the key support, and depression of the deformable portion into the void moves the retaining key from the locked configuration to the released configuration. Further, in some embodiments, the retaining car is a first retaining car, the tab portion further includes a second retaining car disposed proximate the second end of the tab portion, and the first and second retaining cars are separated from one another in a direction parallel to the longitudinal axis by a distance that is greater than a length of the channel in the direction parallel to the longitudinal axis such that the first and second retaining cars are disposed external to the channel and on opposite sides thereof when the retaining key is in the locked configuration.

In some embodiments, the key support is integrally-formed with the container body. In addition, in some embodiments, the container body and key support are formed of a thermoformed plastic. In some embodiments, the closed relief slot includes a substantially linear portion extending substantially parallel to the longitudinal axis of the retaining key. In addition, in some embodiments, the closed relief slot has a length in a direction extending substantially parallel to the longitudinal axis of the retaining key that is longer than that of the retaining car.

Moreover, in some embodiments, the retaining car includes first and second inclined faces respectively configured to engage first and second ends of the first wall proximate first and second ends of the channel when the retaining key is urged toward the locked and released configurations. In some embodiments, the container body includes a pocket positioned adjacent to the key support to receive a finger or thumb of a user to allow for movement of the retaining key between the locked and released configurations through a pinching motion by the user.

Consistent with another aspect of the invention, a key retention system for retaining a product may include a key support including first and second walls defining a channel, and a retaining key supported by the key support and extending through the channel. The retaining key is configured for movement along a longitudinal axis between locked and released configurations, and in the locked configuration the retaining key retains a portion of the product when the product is supported by the container body and in the released configuration the retaining key is retracted to facilitate removal of the product from the container body when the product is supported thereby. The retaining key includes a retaining car extending generally transverse to the longitudinal axis and configured to frictionally engage the first wall of the key support within the channel during at least a portion of the movement of the retaining key between the locked and released configurations, and a closed relief slot formed in the retaining key adjacent to the retaining car and configured to enable flexure of the retaining car during the at least a portion of the movement of the retaining key between the locked and released configurations.

Moreover, in some embodiments, the retaining key includes a tab portion including first and second ends and the retaining car is disposed on the tab portion intermediate the first and second ends thereof, and the first end of the tab portion is configured to extend over the portion of the product when the retaining key is in the locked configuration. In some embodiments, the retaining key further includes an anchor portion and a deformable portion extending between the tab portion and the anchor portion, the deformable portion is configured to be suspended over a void defined by the key support when the retaining key is supported by the key support, the anchor portion is configured to anchor the retaining key to the key support, and depression of the deformable portion into the void moves the retaining key from the locked configuration to the released configuration.

In addition, in some embodiments, the retaining car is a first retaining car, the tab portion further includes a second retaining ear disposed proximate the second end of the tab portion, and the first and second retaining cars are separated from one another in a direction parallel to the longitudinal axis by a distance that is greater than a length of the channel in the direction parallel to the longitudinal axis such that the first and second retaining cars are disposed external to the channel and on opposite sides thereof when the retaining key is in the locked configuration.

In some embodiments, the closed relief slot includes a substantially linear portion extending substantially parallel to the longitudinal axis of the retaining key. Moreover, in some embodiments, the closed relief slot has a length in a direction extending substantially parallel to the longitudinal axis of the retaining key that is longer than that of the retaining car. Also, in some embodiments, the retaining ear includes first and second inclined faces respectively configured to engage first and second ends of the first wall proximate first and second ends of the channel when the retaining key is urged toward the locked and released configurations.

Consistent with another aspect of the invention, a retaining key may be provided for use in a key retention system for retaining a product in a container body, where the key retention system is of a type includes a key support including first and second walls defining a channel, where the retaining key is configured to be supported by the key support and extend through the channel for movement along a longitudinal axis between locked and released configurations, such that in the locked configuration the retaining key retains a portion of the product when the product is supported by the container body and in the released configuration the retaining key is retracted to facilitate removal of the product from the container body when the product is supported thereby, and where the retaining key includes a retaining car extending generally transverse to the longitudinal axis and configured to frictionally engage the first wall of the key support within the channel during at least a portion of the movement of the retaining key between the locked and released configurations, and a closed relief slot formed in the retaining key adjacent to the retaining car and configured to enable flexure of the retaining car during the at least a portion of the movement of the retaining key between the locked and released configurations.

In some embodiments, the closed relief slot includes a substantially linear portion extending substantially parallel to the longitudinal axis of the retaining key. In addition, in some embodiments, the closed relief slot has a length in a direction extending substantially parallel to the longitudinal axis of the retaining key that is longer than that of the retaining car.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
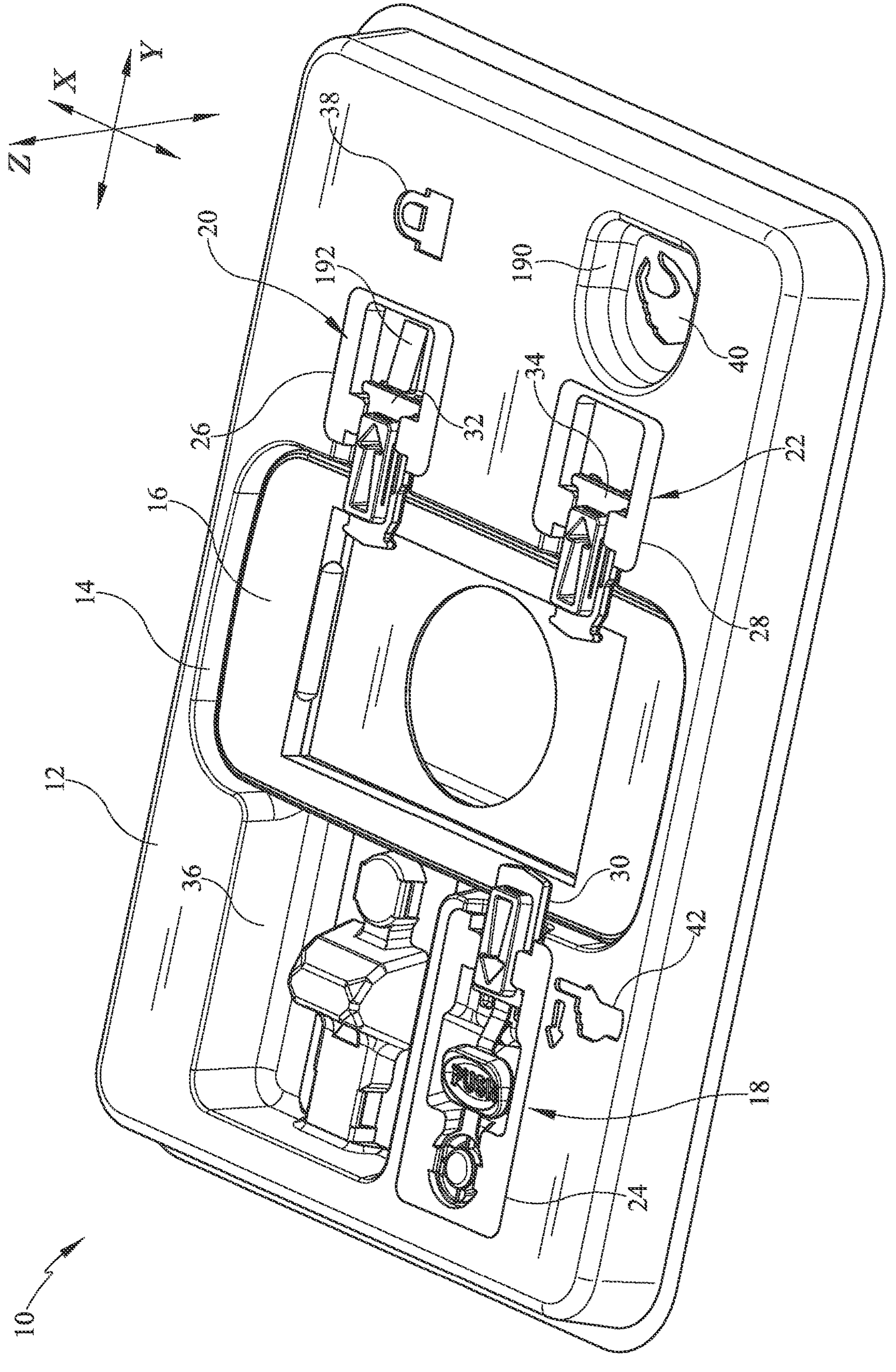
FIG. 1 is a perspective view of one embodiment of a product package including a key retention system, including three key supports with retaining keys in locked configurations.

FIG. 1 illustrates an embodiment of a product package 10 including a container body 12 including one or more recesses 14 for housing a product 16, as well as a plurality of key retention systems 18, 20, 22 for use in containing within and releasing product 16 from container body 12. Each key retention system 18, 20, 22 generally includes a key support 24, 26, 28 that is configured to support and retain a corresponding retaining key 30, 32, 34.

In some embodiments, the product to be contained may be a medical device, instrument or component. In other embodiments, the product to be contained may be a consumer product, such as a children's toy, a household good, tool, or the like. However, this is not to be understood to be limiting, as the retaining key and key support may be used as part of a package for an innumerable variety of products, components, devices, or the like. Container body 12 may support product 16 in two dimensions X, Y in order to minimize movement of the product in the container body. Further, container body 12 may support product 16 in one direction of a third dimension Z, only leaving one direction of the third dimension Z unsupported by container body 12 (i.e., the opening of container body 12). Dimensions X, Y, and Z do not imply any particular physical orientation, and are provided for illustrative purposes only. Retaining keys 30, 32, 34, when in locked configurations as illustrated in FIG. 1, restrict movement of product 16 in the opposite direction along the third dimension Z, and thereby retaining product 16 in container body 12.

In some embodiments, container body 12 is constructed of plastic, e.g., as may be formed via thermoforming or injection molding. In other embodiments, container body 12 may be constructed of metal, paper, or any other suitable material or combination of materials as is generally known in the art. Although any suitable method may be used in forming container body 12 and each key support 24, 26, 28, it may be desirable in some embodiments for container body 12 and each key support 24, 26, 28 to be integrally-formed with container body 12 via a molding process. In some embodiments, this molding may be achieved through an injection molding process; in other embodiments, the molding may be achieved through a thermoforming process. In such embodiments, each key support 24, 26, 28 may be molded or formed as an integral part of container body 12 from a mold during the molding or forming of container body 12 itself. In other embodiments, each key support 24, 26, 28 may be separately constructed, but either permanently or removably affixed to container body 12. In addition, as illustrated in FIG. 1, container body 12 may additionally have formed therein various structures, e.g., various instructional icons, text, and/or recesses 36, 38, 40, 42 capable of providing information such as instructions on how to release a product, what product is stored in the product package, etc.

It will be appreciated that product package 10 is merely one of an innumerable number of package designs that may be utilized, as the configuration of container body 12 and the recesses defined therein, the number and types of key retention systems, etc., may vary considerably based upon the type of product to be housed in the product package. Therefore, the invention is not limited to the specific configuration illustrated in FIG. 1.

Now turning to FIGS. 2-6, an example embodiment of key retention system 30 is illustrated in greater detail. Key retention system 18 is similar to the key retention system disclosed in U.S. Pat. No. 10,577,165 to Sadowski et al., which is incorporated by reference herein. As such, key support 24 of key retention system 18 is configured to support retaining key 30 in a manner that allows retaining key 30 to move between locked and released configurations within key support 24. When in a locked configuration, retaining key 30 retains a portion of a product that is supported in two-dimensions by the container body; and, while in a released configuration, retaining key 30 retracts to facilitate the removal of the product from the container body.

Figure 2:
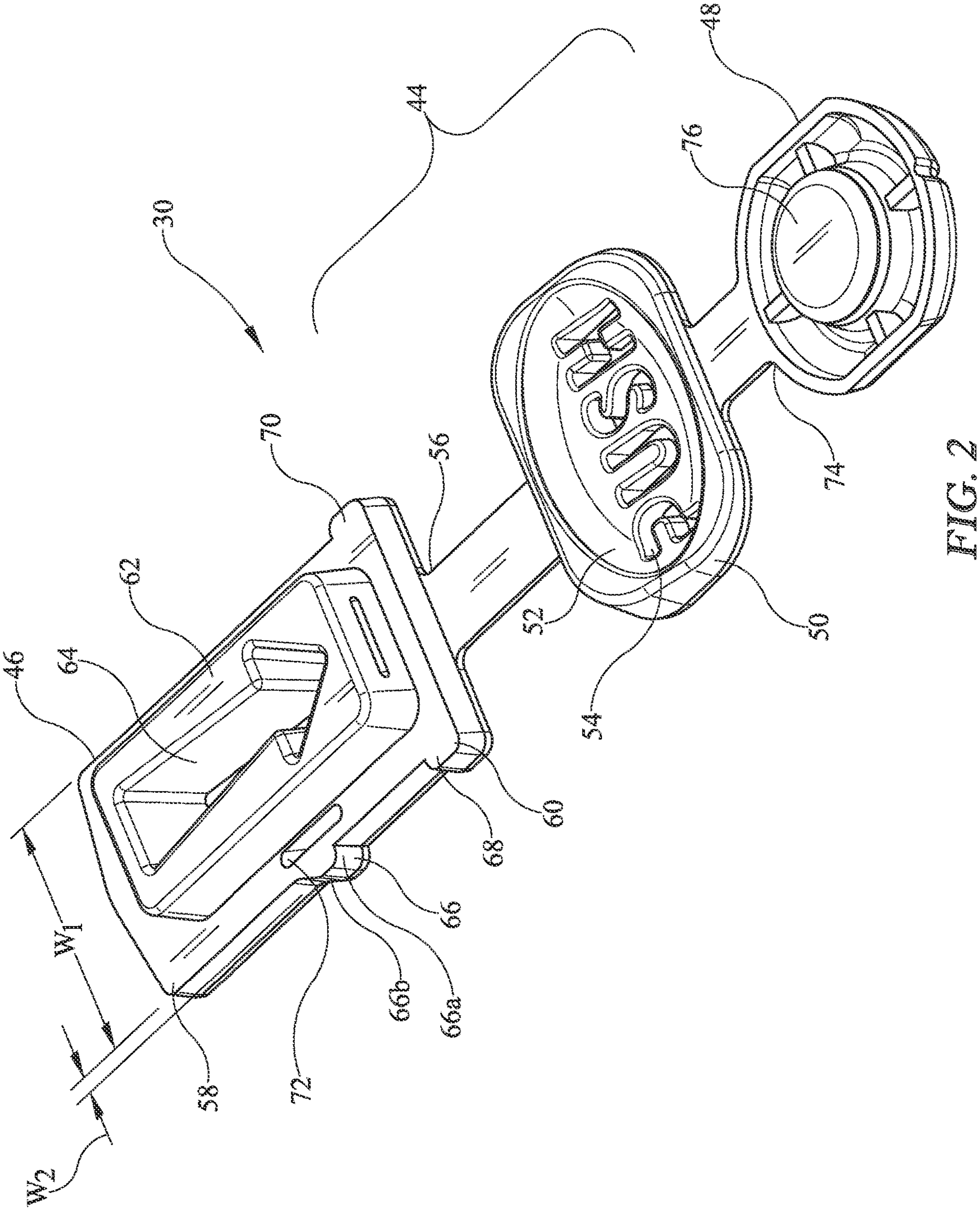
FIG. 2 is a top perspective view of a retaining key in the product package of FIG. 1.

With specific reference to FIG. 2, retaining key 30 may include a deformable portion 44 that may extend between a tab portion 46 and an anchor portion 48. In some embodiments, deformable portion 44 may be constructed in the form of a thin, flexible, plastic strip, but this is not to be understood as limiting, as deformable portion 44, as the name suggests, may be constructed of any material capable of being deformed when pressure is applied. In some embodiments, for example, retaining key 30 may be molded from HDPE (High Density Polyethylene), although other materials and/or manufacturing methods may be used in other embodiments.

Deformable portion 44 may further include a push target 50, which may be positioned along the length of deformable portion 44. In some embodiments, this push target may further comprise a button or depression 52 to facilitate activation by a user's finger, and in some instances, an icon or text (e.g., "push") 54 may be molded into push target 50 to instruct a user on the usage of the key retention system.

Tab portion 46 may be positioned proximate a first end 56 of deformable portion 44 of retaining key 30, and may include a first end 58 and a second end 60. When in a locked configuration, tab portion 46 of retaining key 30 retains a portion of product 16 in recess 14 of container body 12, as first end 58 of tab portion 46 is configured to extend over a portion of product 16 when retaining key 30 is in the locked configuration. In some embodiments, the tab portion includes a raised portion 62 in the center, which may include a center aperture 64 that may extend partially or completely through the retaining key. In some embodiments, center aperture 64 may be formed in the shape of an icon or text (e.g., an arrow) instructing a user on how to move the retaining key from the locked configuration to the released configuration.

In some embodiments, tab portion 46 may also include one or more retaining ears, e.g., retaining ear 66, which may extend generally transverse to a longitudinal axis L of the retaining key (FIG. 3) and be positioned intermediate first end 58 and second end 60 of tab portion 46, and which may function to maintain retaining key 30 in a locked configuration once loaded in key support 24. Further, one or more additional retaining ears, e.g., retaining ears 68, 70, may be disposed proximate second end 60 of tab portion 46 to restrict removal of retaining key 30 from key support 24. As will be discussed in greater detail below, tab portion 46 may also include one or more closed relief slots adjacent one or more of retaining ears 66, 68, 70 (e.g., closed relief slot 72 adjacent retaining ear 66) to allow for flexure of such retaining ear(s) and thereby better accommodate manufacturing and other variations in key support 24, as well as reduce interference between the retaining ear and the key support, which then may reduce the force required to extend and retract the retaining key.

Anchor portion 48 may be positioned proximate a second end 74 of deformable portion 44 of retaining key 30. In some embodiments, anchor portion 48 may be substantially circular or ovoid in shape. In some embodiments, anchor portion 48 may be recessed inward with a raised center portion 76, and in some embodiments may include one or more recessed notches that may facilitate sliding retaining key 30 in key support 24 from a loading configuration to a locked configuration.

Figure 3:
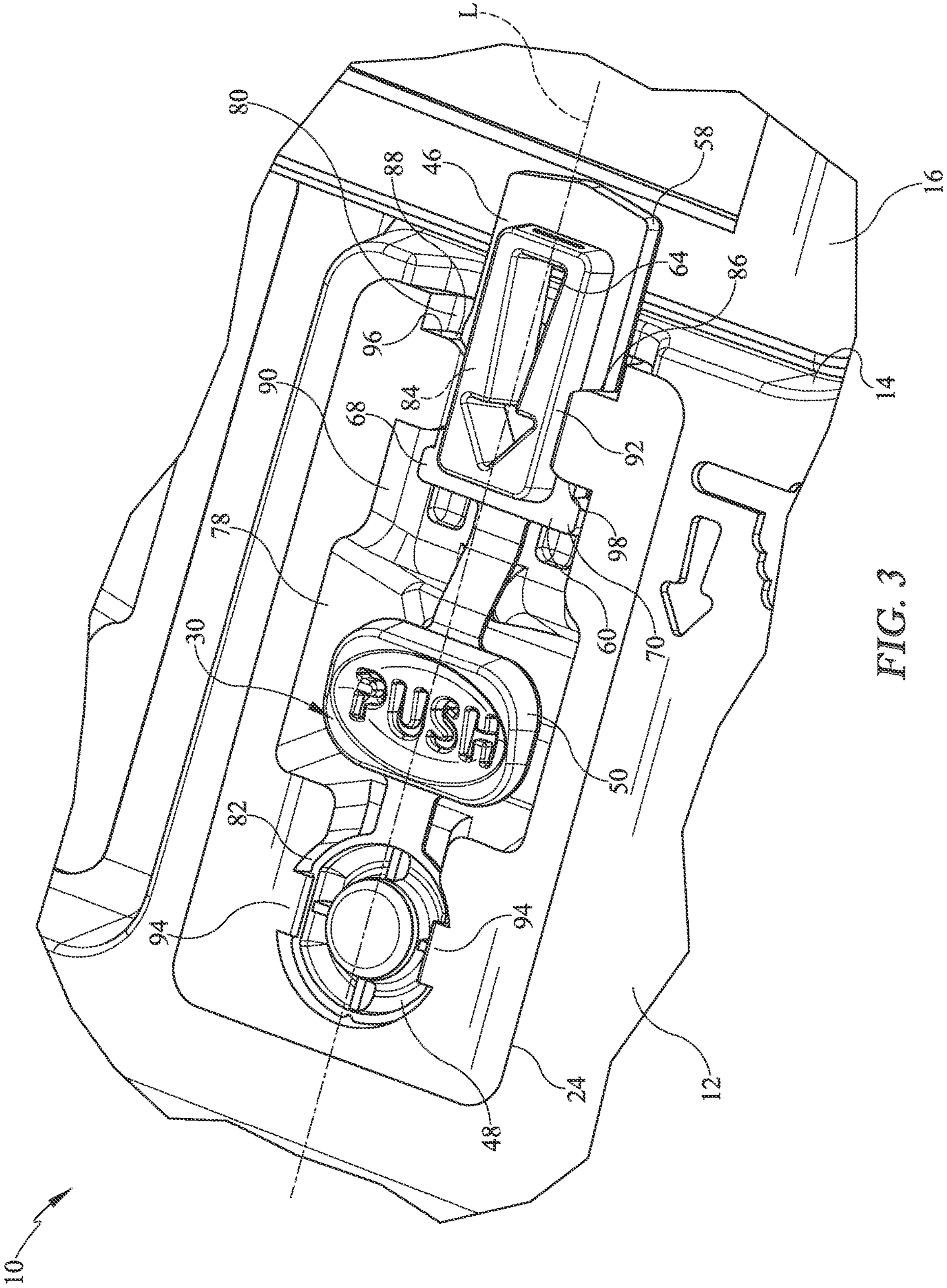
FIG. 3 is an enlarged perspective view of the product package of FIG. 1, with the retaining key of FIG. 2 in a locked configuration.

With reference to FIG. 3, this figure illustrates retaining key 30 loaded into key support 24 and in a locked configuration. In this regard, and as discussed in the aforementioned '165 patent, key support 24 may be configured with a depression void 78, a tab void 80, and an anchor retainer 82, e.g., using a molding process as described in the aforementioned '165 patent.

Figure 6:
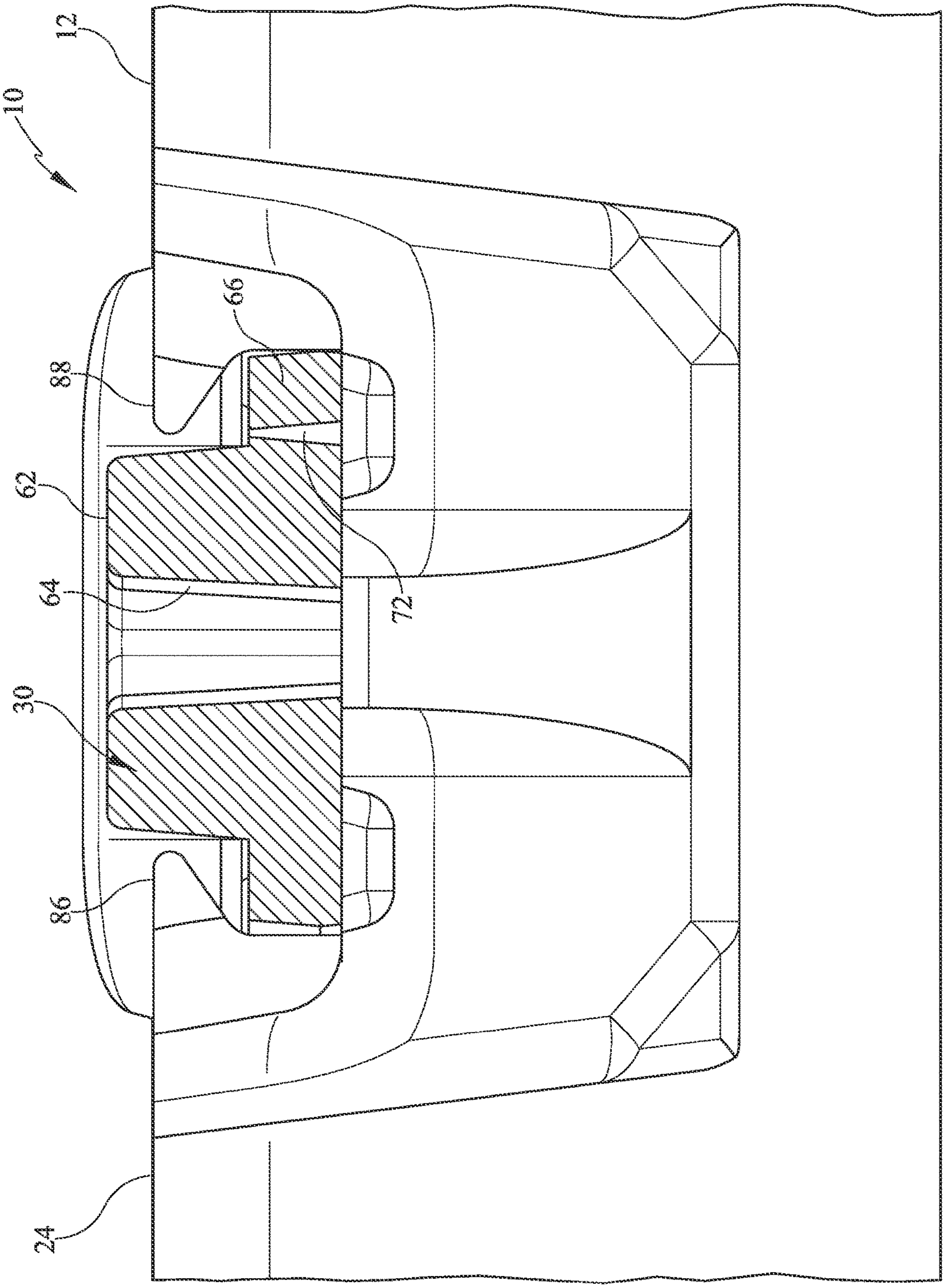
FIG. 6 is a cross-sectional view taken through lines 6-6 of FIG. 5.

Depression void 78 may be configured to receive deformable portion 44 of retaining key 30 when retaining key 30 is in a released configuration (see FIG. 6). As such, in some embodiments, depression void 78 may be deeper (e.g., extending further in a direction generally transverse to a plane of retaining key 30) than tab void 80 or anchor retainer 82. Deformable portion 44 is generally suspended over depression void 78 when retaining key 30 is in the locked configuration.

Tab void 80 may be configured to receive tab portion 46 of retaining key 30. Tab void 80 may further comprise a channel 84 defined by a pair of tapered walls 86, 88 on each side of channel 84 for receiving tab portion 46 of retaining key 30. In such embodiments, tapered walls 86, 88 are formed at an angle such that channel 84 is narrower at the top of key support 24 and wider at the bottom of key support 24. This difference in width of channel 84 due to the tapered walls 86, 88 may allow tab portion 46 of retaining key 30 to be restricted from movement in directions other than generally along a longitudinal axis L of retaining key 30 by tab void 80 of key support 24. In some embodiments, tab void 80 may further include a wider portion 90 proximate channel 84 for use in receiving push target 50 when retaining key 30 is being loaded into key support 24. Tapered walls 86, 88 are also separated by a gap 92 that provides sufficient spacing therebetween to enable a length of deformable portion 44 to fit between the tapered walls when loading retaining key 30 into key support 24. In other embodiments, however, no such spacing may be provided, or alternatively, tapered walls 86, 88 may join together such that gap 92 is omitted and channel 84 is open only on opposing ends, e.g., where retaining key 30 is sized and configured to enable tab portion 46 to be inserted into one end of channel 84 when loading retaining key 30 in key support 24.

Anchor retainer 82 is configured to retain anchor portion 48 of retaining key 30, and may be configured in some embodiments as a circular void with one or more tapered tabs 94 positioned at the top of the anchor retainer and extending slightly over the void. These tapered tabs may be constructed at an angle such that the tabs taper inwardly to allow anchor portion 48 of retaining key 30 to be held vertically in place (i.e., be anchored) by anchor retainer 82 of key support 24. In other embodiments, anchor retainer 82 may be in the form of a post to which anchor portion 48 of retaining key 30 may permanently or semi-permanently affix. Additionally, or alternatively, anchor portion 48 of retaining key 30 may snap onto, or couple with, an anchor retainer that is in the form of a post. Other manners of permanently or temporarily securing anchor portion 48 to key support 24 will be appreciated by those of ordinary skill having the benefit of the instant disclosure.

A product may be retained within a container body utilizing a retaining key and key support through a variety of methods. An exemplary method in accordance with the principles herein includes the steps of loading a product into a container body so that the product is held in place in at least two dimensions by the container body, inserting a retaining key into a key support, such that the tab portion of the retaining key is extended over the product in a loading position, and locking the retaining key into a locked configuration. One manner of loading of retaining key 30 in key support 24 is described, for example, in the aforementioned '165 patent, and after loading, the retaining key is in the locked configuration illustrated in FIG. 3.

In the locked configuration, retaining key 30 is positioned such that anchor portion 48 is locked into anchor retainer 82, and with tab portion 46 positioned within channel 84 with retaining ear 66 disposed at one end 96 of channel 84 and with retaining cars 68, 70 disposed at an opposite end 98 of channel 84. The cars 66, 68, 70 are sized and configured relative to walls 86, 88 that define channel 84 (e.g., they project outwardly from tab portion 46 in a direction generally transverse to longitudinal axis L beyond the space provided between walls 86, 88) to restrict movement of tab portion 46 along longitudinal axis L. Further, cars 68, 70 are separated from car 66 along longitudinal axis L a greater distance that the length of channel 84 such that all cars 66, 68, 70 are desirably external to channel 84, and on opposite sides thereof, when in the locked configuration. In addition, in the illustrated embodiment of the locked configuration, tab portion 46 of retaining key 30 may be at least partially extended over a product (i.e., with first end 58 extending over recess 14 so that the product is retained in the container). In such an embodiment, deformable portion 44 at least partially extends over depression void 78.

Just as a product may be retained within a container body utilizing a retaining key and key support through a variety of methods, so may a product be released from containment through a variety of methods. An exemplary method in accordance with the principles herein includes activating a movable portion of the retaining key and removing the product from the container body. In some embodiments, the movable portion may be a deformable portion; while in other embodiments, the movable portion may be a rotating piece.

Figure 4:
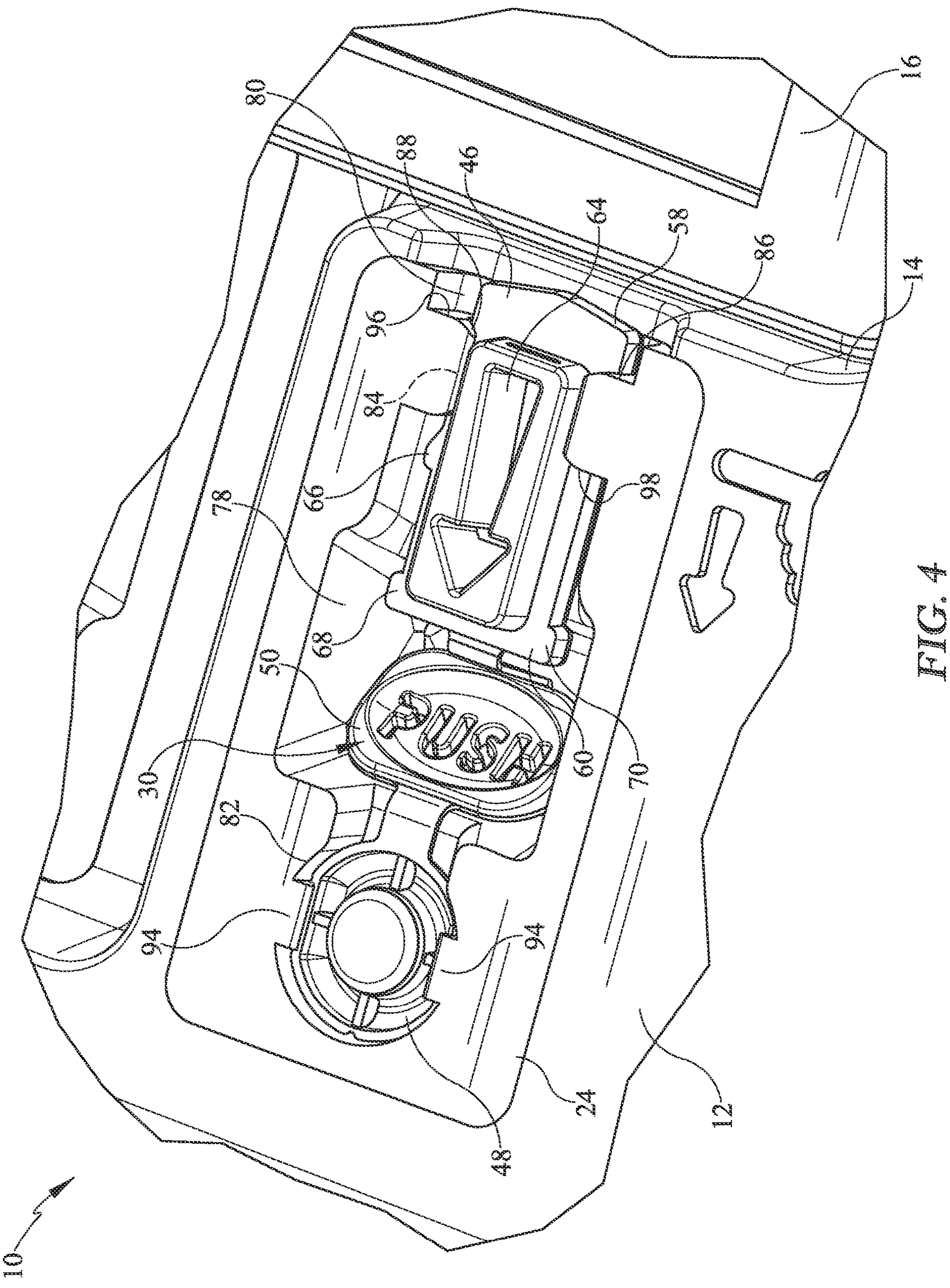
FIG. 4 is an enlarged perspective view of the product package of FIG. 1, with the retaining key of FIG. 2 in a released configuration.

FIG. 4 illustrates retaining key 30 after being moved from the locked configuration to the released configuration. In the illustrated embodiment, push target 50 may be depressed into depression void 78, e.g., via a user's finger, or by an instrument or tool, which results in at least part of deformable portion 44 flexing, or collapsing, into depression void 78. The flexing, or collapse of, deformable portion 44 into depression void 78 causes tab portion 46 to retract away from the product contained within the container body, thereby moving the tab portion away from the locked configuration of FIG. 3 in which it retains the product in container body 12, and to the position illustrated in FIG. 4 in which the tab portion no longer extends over the recess a sufficient distance to secure the product in the container body.

It may also be desirable in some embodiments to configure retaining key 30 and key support 24 to maintain retaining key 30 in the released configuration once the released configuration is established, i.e., to prevent retaining key 30 from being moved back to the locked configuration from the released configuration. It may be particularly desirable, for example, when multiple retaining keys and key supports are used to secure one or more products into a container body, as the multiple retaining keys may be individually actuated and maintained in the released configuration to facilitate removal of the product(s) from the container body once all retaining keys have been actuated. As such, when retaining key 30 is moved from the locked configuration to the released configuration, retaining car 66 of tab portion 46 moves from end 96 to end 98 of channel 84, such that movement of tab portion 46 back to the locked configuration is restricted by channel 84. In other embodiments, however, movement of retaining car 66 all of the way to end 98 may not be supported, e.g., such that retaining car 66 is disposed within channel 84 when retaining key 30 is in the released configuration.

Figure 5:
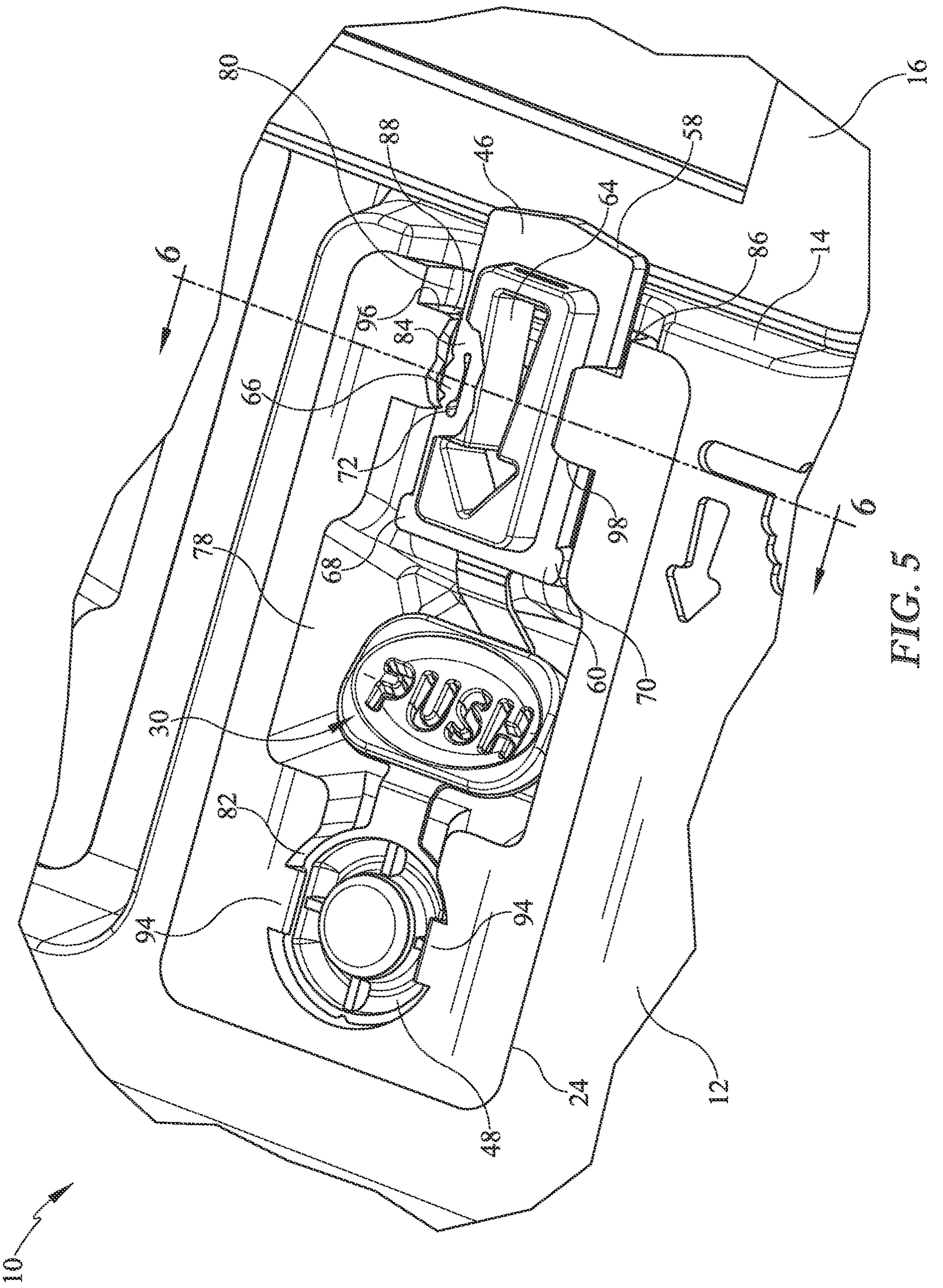
FIG. 5 is an enlarged perspective view of the product package of FIG. 1, with the retaining key of FIG. 2 in an intermediate configuration.

It will therefore be appreciated that, when retaining key 30 moves between the locked and released configurations, retaining car 66 moves through channel 84. FIGS. 5-6, for example, illustrate an intermediate configuration of retaining key 30 where retaining car 66 is disposed within channel 84.

It will be appreciated that the dimensions of retaining key 30, as well as those of retaining car 66, may generally be configured relative to the dimensions of channel 84 to allow for movement of retaining car 66 through the channel, but still restrict retaining car 66 from reentering the channel once the retaining key has been moved to the released configuration. In addition, in some instances, some frictional resistance when transitioning from the locked configuration to the released configuration may be desirable to prevent a retaining key from being inadvertently transitioned to the released configuration. In addition, these various dimensions may be controlled based at least in part on the material characteristics of the retaining key and the key support, as the amount of frictional resistance depends in part on the pliability of the materials. For example, thermoformed container bodies may be constructed of a relatively thin and flexible material, e.g., PETG (polyethylene terephthalate glycol), PVC (polyvinyl chloride), PET (polyethylene terephthalate), Polypropylene, Polyethylene, Styrene, etc., having a thickness of about 0.5 to about 2.0 mm (about 0.020" to about 0.070"), while retaining key 30 may be constructed of a thicker and/or more rigid material, e.g., HDPE, such that walls 86, 88 will generally have some degree of pliability when tab portion 46 and retaining car 66 pass through channel 84. It may also be desirable to utilize HDPE or another suitable material having a reduced coefficient of friction for retaining key 30 when used in conjunction with a thermoformed material for the container body, as doing so may result in the retaining key being able to extend and or retract with less force than if both the retaining key and thermoformed container body were manufactured from the same material. In some embodiments, for example, for a retaining key 30 having a tab portion with a width W1 (FIG. 2) of about 13.8 mm (about 0.540"), it may be desirable to utilize a channel with walls 84, 86 having a separation S (FIG. 6) at the same elevation as the base of the tab portion of about 14 mm (about 0.550"), and with retaining car 66 having a width W2 and projecting from the side of tab portion 46 about 0.8 mm (0.030") mm, such that the combined width of tab portion 46 and retaining car 66 is about 0.6 mm (about 0.024") wider than the separation between walls 84, 86.

It has been found, however, that due to variations in material thicknesses, wall spacings, and tolerances, particularly with regard to the thermoformed container bodies and/or key supports, providing consistent and repeatable performance can present challenges. In particular, it will be appreciated that a particular retaining key construction may be usable in a wide variety of applications, including various designs of container bodies that are specific to different products. In addition, a retaining key in some embodiments may be injection molded from a relatively rigid material, and thus may be designed and constructed with relatively tight dimensional tolerances. On the other hand, particularly where thermoforming is used for a key support and/or container body, the dimensional tolerances may be substantially looser, such that a given retaining key construction may encounter varying levels of frictional resistance when transitioning between locked and released configurations in different key supports, including key supports in different locations on a given container body, as well as key supports in the same location in different container bodies. In the example above, for example, it may be expected that a thermoformed channel specified with a separation S of about 14 mm (about 0.550") may vary between about 13.8 mm and about 14.2 mm (about 0.540" and about 0.560"), such that the combined width of tab portion 46 and retaining car 66 may vary between about 0.4 mm (about 0.016") and about 0.8 mm (about 0.032") wider than the separation between walls 84, 86.

One specific instance where performance may be suboptimal occurs when excessive frictional resistance is encountered when transitioning from the locked configuration to the released configuration, which can make it more difficult for a user to release a product from the container body. In some embodiments of the invention, however, it may be desirable to include one or more closed relief slots, e.g., closed relief slot 72 (see FIG. 2), which are internal to tab portion 46 (i.e., are fully circumscribed by material in tab portion 46), and which allow for retaining car 66 to be deflected inwardly when in channel 84 and thereby reduce the frictional resistance presented when tab portion 46 moves through channel 84. As illustrated in FIGS. 5-6, for example, retaining car 66 is allowed to deflect inwardly and compress closed relief slot 72. In addition, the amount of deflection may vary based upon the separation between walls 86, 88 thereby providing more consistent frictional resistance over a wider range of wall 86, 88 separations. It has been found, for example, that with the example configuration and dimensions described above, the range of forces required transition from the locked configuration to the released configuration with the incorporation of a closed relief slot may be between about 1 and 2 lbs., vs. between about 1 and 6 lbs. in the absence of such a closed relief slot.

In addition, as illustrated in FIG. 2, an inclined face **66*a* of retaining car 66 (which generally faces second end 60 of tab portion 46) may have a greater incline relative to an inclined face 66*b* that generally faces first end 58 of tab portion 46. Doing so may increase the resistance needed to move the retaining key from the locked configured to the released configuration when urging the retaining key towards the released configuration, relative to the resistance needed when initially loading retaining key 30 into key support 24, as well as when urging the retaining key towards the locked configuration when in the released configuration. In other embodiments, however, different face profiles may be used for retaining car 66, so the invention is not limited to the specific face profile illustrated in FIG. 2**.

In the illustrated embodiment, closed relief slot 72 includes a substantially linear portion that extends substantially parallel to longitudinal axis L. In addition, in some embodiments, the length of the closed relief slot may be longer than that of retaining car 66 in a direction substantially parallel to the longitudinal axis.

Various modifications may also be made to retaining key 30 in other embodiments. For example, rather than having a single retaining car 66 that is configured to move through channel 84 when the retaining key moves between the locked and released configurations, multiple such retaining cars, e.g., one or more pairs of opposing retaining cars, each with an associated closed relief slot, may be used in other embodiments. Multiple retaining cars 66 may also be staggered along the longitudinal axis of tab portion 46 in other embodiments, and closed relief slots may also be positioned adjacent retaining cars 68 and/or 70 in some embodiments.

In addition, rather than having a single closed relief slot 72 for a retaining car 66, multiple closed relief slots may be used adjacent a particular retaining car in some embodiments.

In addition, in some embodiments, retaining cars and/or slots may have other geometries, e.g., various curved and/or curvilinear shapes, and with inclined surfaces having various curved and/or curvilinear profiles. In addition, in some embodiments, the techniques described herein may also be used in connection with anchor portion 48 to facilitate installation.

Furthermore, a closed relief slot may be positioned adjacent multiple retaining cars on the same and/or different sides of a retaining key. In some embodiments, for example, a center aperture (e.g., center aperture 64 of retaining key 30) may be dimensioned and located sufficiently adjacent to one or more retaining cars on a retaining key to provide sufficient flexure of the entire retaining key across its width, and thereby effectively operate as a closed relief slot. In addition, in some embodiments, a closed relief slot may be filled with a flexible material (i.e., a material having greater flexibility than the retaining key itself).

In addition, a closed relief slot may be used with retaining cars on other types of key retention systems. FIGS. 7-11, for example, illustrate key retention system 22 in greater detail, and it will be appreciated that key retention system 20 may be similarly configured. Key support 28 of key retention system 22 is configured to support retaining key 34 in a manner that allows retaining key 34 to move between locked and released configurations within key support 28. When in a locked configuration, retaining key 34 retains a portion of a product that is supported in two-dimensions by the container body; and, while in a released configuration, retaining key 34 retracts to facilitate the removal of the product from the container body.

Figure 7:
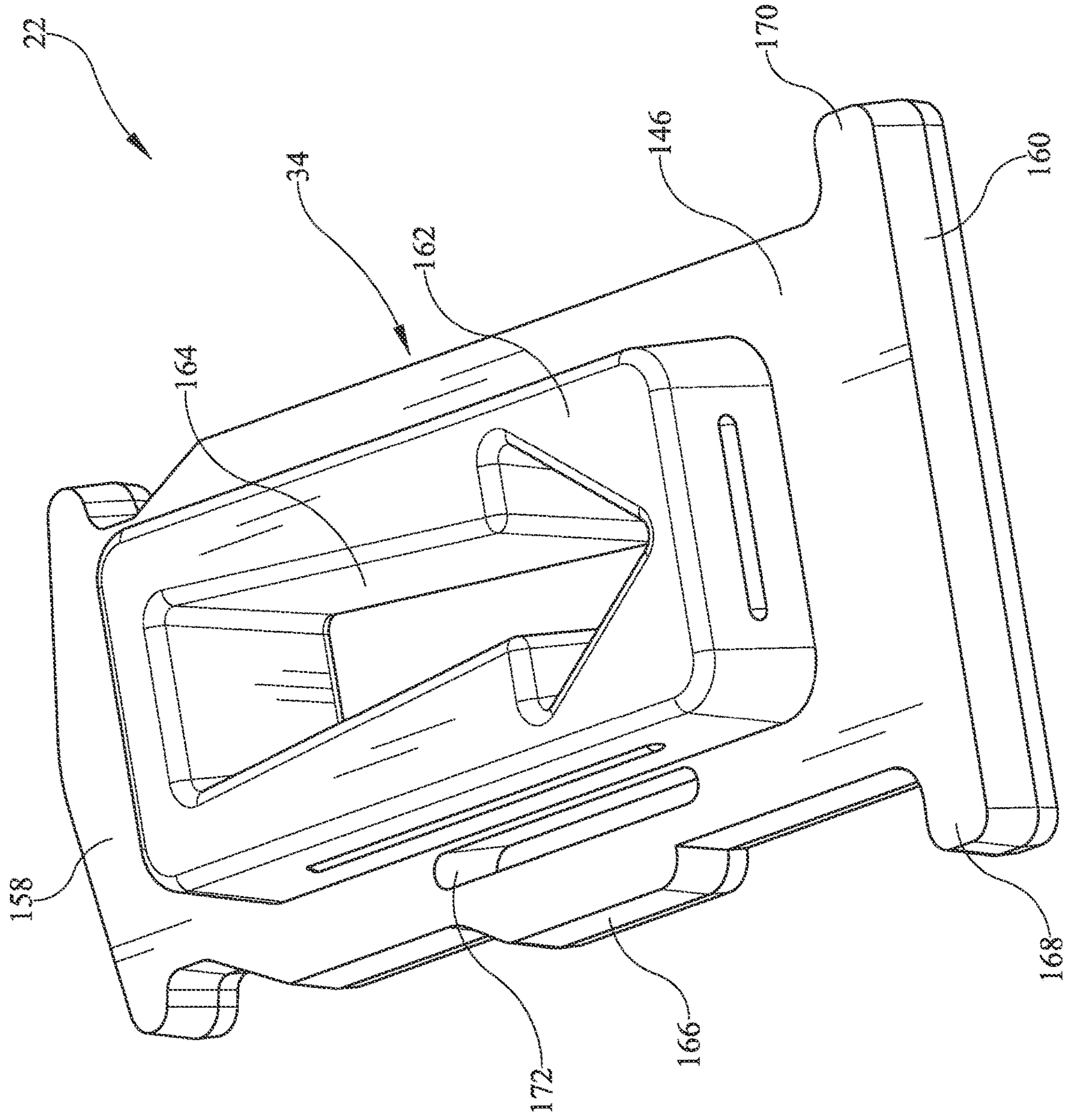
FIG. 7 is a top perspective view of another retaining key in the product package of FIG. 1.

With specific reference to FIG. 7, retaining key 34 may include a tab portion 146, but may omit the deformable portion and anchor portion of retaining key 30, such that movement between the locked and released configurations is performed by engaging the top of tab portion 146 with a finger or instrument and sliding the tab portion 146, rather than pushing down on a push target, as is the case with retaining key 30. Tab portion 146 may include a first end 158 and a second end 160. When in a locked configuration, tab portion 146 of retaining key 34 retains a portion of product 16 in recess 14 of container body 12. In some embodiments, the tab portion includes a raised portion 162 in the center, which may include a center aperture 164 that may extend partially or completely through the retaining key. In some embodiments, center aperture 164 may be formed in the shape of an icon or text (e.g., an arrow) instructing a user on how to push the retaining key within the key support in order to move from the locked configuration to the released configuration.

In some embodiments, tab portion 46 may also include one or more retaining cars, e.g., retaining car 166, which may be positioned between first end 158 and second end 160 of tab portion 146, and which may function to maintain retaining key 34 in a locked configuration once installed in key support 28. Further, one or more additional retaining cars, e.g., retaining cars 168, 170, may be disposed proximate second end 160 of tab portion 146 to restrict removal of retaining key 34 from key support 28. As will be discussed in greater detail below, tab portion 146 may also include one or more relief slots adjacent one or more of retaining cars 166, 168, 170 (e.g., relief slot 172 adjacent retaining car 166) to allow for flexure of such retaining car(s) and thereby better accommodate manufacturing and other variations in key support 28.

Figure 8:
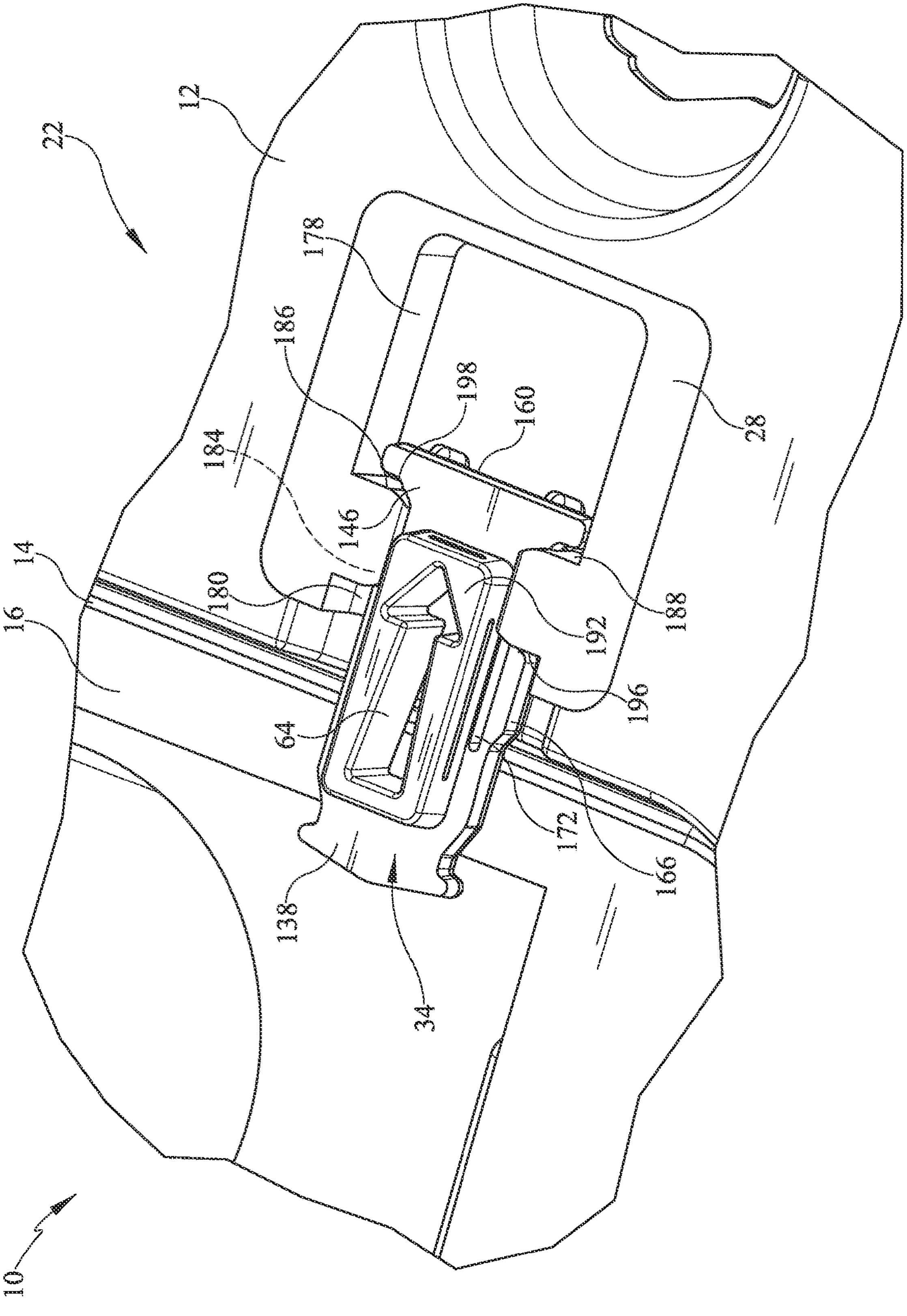
FIG. 8 is an enlarged perspective view of the product package of FIG. 1, with the retaining key of FIG. 7 in a locked configuration.

With reference to FIG. 8, this figure illustrates retaining key 34 loaded into key support 28 and in a locked configuration. In this regard, key support 28 may be configured with a release void 178 and a tab void 180, but may omit the use of an anchor retainer. Release void 178 may be configured to receive at least a portion of tab portion 146 of retaining key 34 when retaining key 34 is in a released configuration (see FIG. 9). Tab void 180 may also be configured to receive at least a portion of tab portion 146 of retaining key 34. Tab void 180 may further comprise a channel 184 defined by a pair of tapered walls 186, 188 on each side of channel 184 for receiving tab portion 146 of retaining key 34. In such embodiments, tapered walls 186, 188 are formed at an angle such that channel 184 is narrower at the top of key support 28 and wider at the bottom of key support 28. This difference in width of channel 184 due to the tapered walls 186, 188 may allow tab portion 146 of retaining key 34 to be restricted from movement in directions other than generally along a longitudinal axis L of retaining key 34 by tab void 180 of key support 28. Tapered walls 186, 188 are also separated by a gap 192; however, in other embodiments, tapered walls 186, 188 may join together such that gap 192 is omitted and channel 184 is open only on opposing ends, e.g., where retaining key 34 is sized and configured to enable tab portion 146 to be inserted into one end of channel 184 when loading retaining key 34 in key support 28.

In the locked configuration, retaining key 34 is positioned such that tab portion 146 positioned within channel 184 with retaining ear 166 disposed at one end 196 of channel 184 and with retaining cars 168, 170 disposed at an opposite end 198 of channel 184. The cars 166, 168, 170 are sized and configured relative to walls 186, 188 that define channel 184 (e.g., they project outwardly from tab portion 146 in a direction generally transverse to longitudinal axis L beyond the space provided between walls 186, 188) to restrict movement of tab portion 146 along longitudinal axis L. Further, cars 168, 170 are separated from car 166 along longitudinal axis L such that all cars 166, 168, 170 are desirably external to channel 184 when in the locked configuration. In addition, in the illustrated embodiment of the locked configuration, tab portion 146 of retaining key 34 may be at least partially extended over a product (i.e., with first end 158 extending over recess 14 so that the product is retained in the container.

Figure 9:
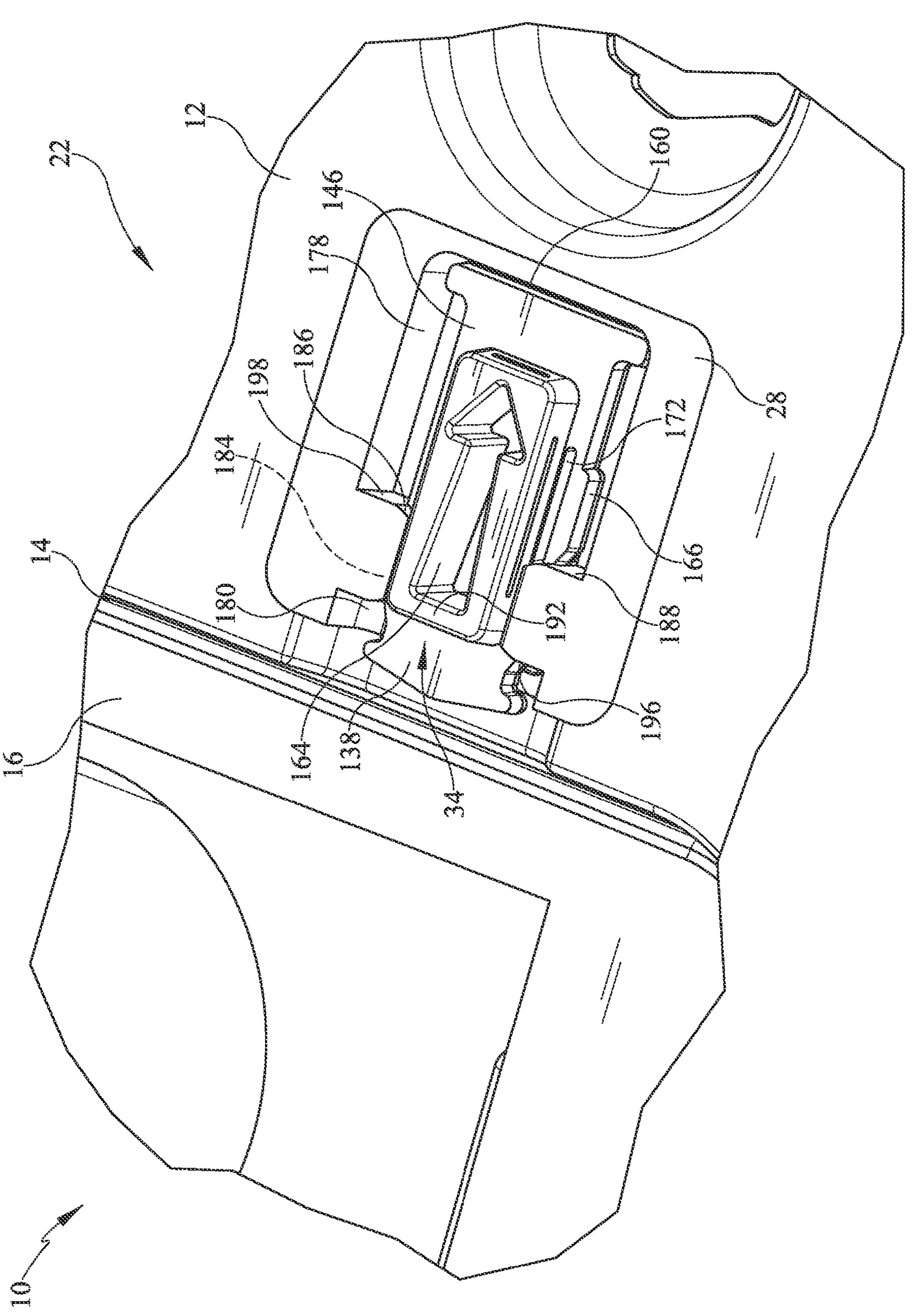
FIG. 9 is an enlarged perspective view of the product package of FIG. 1, with the retaining key of FIG. 7 in a released configuration.

FIG. 9 illustrates retaining key 34 after being moved from the locked configuration to the released configuration, whereby tab portion 146 is retracted away from the product contained within the container body, thereby moving the tab portion away from the locked configuration of FIG. 8 in which it retains the product in container body 12, and to the position illustrated in FIG. 9 in which the tab portion no longer extends over the recess a sufficient distance to secure the product in the container body.

As with retaining key 30, when retaining key 34 is moved from the locked configuration to the released configuration, retaining car 166 of tab portion 146 moves from end 196 to end 198 of channel 184, such that movement of tab portion 146 back to the locked configuration is restricted by channel 184. In other embodiments, however, movement of retaining car 166 all of the way to end 198 may not be supported, e.g., such that retaining car 166 is disposed within channel 184 when retaining key 34 is in the released configuration.

Figure 10:
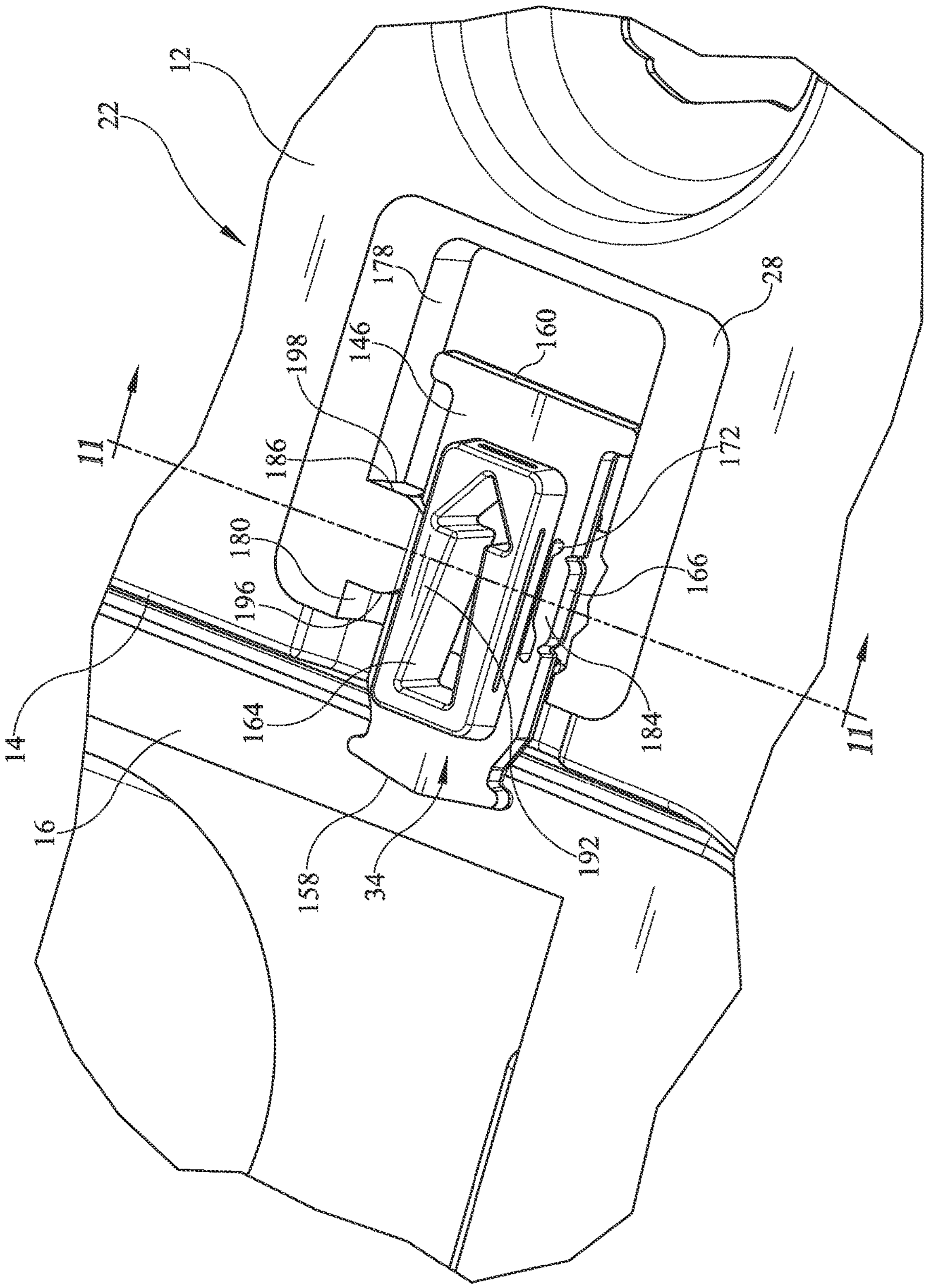
FIG. 10 is an enlarged perspective view of the product package of FIG. 1, with the retaining key of FIG. 7 in an intermediate configuration.
Figure 11:
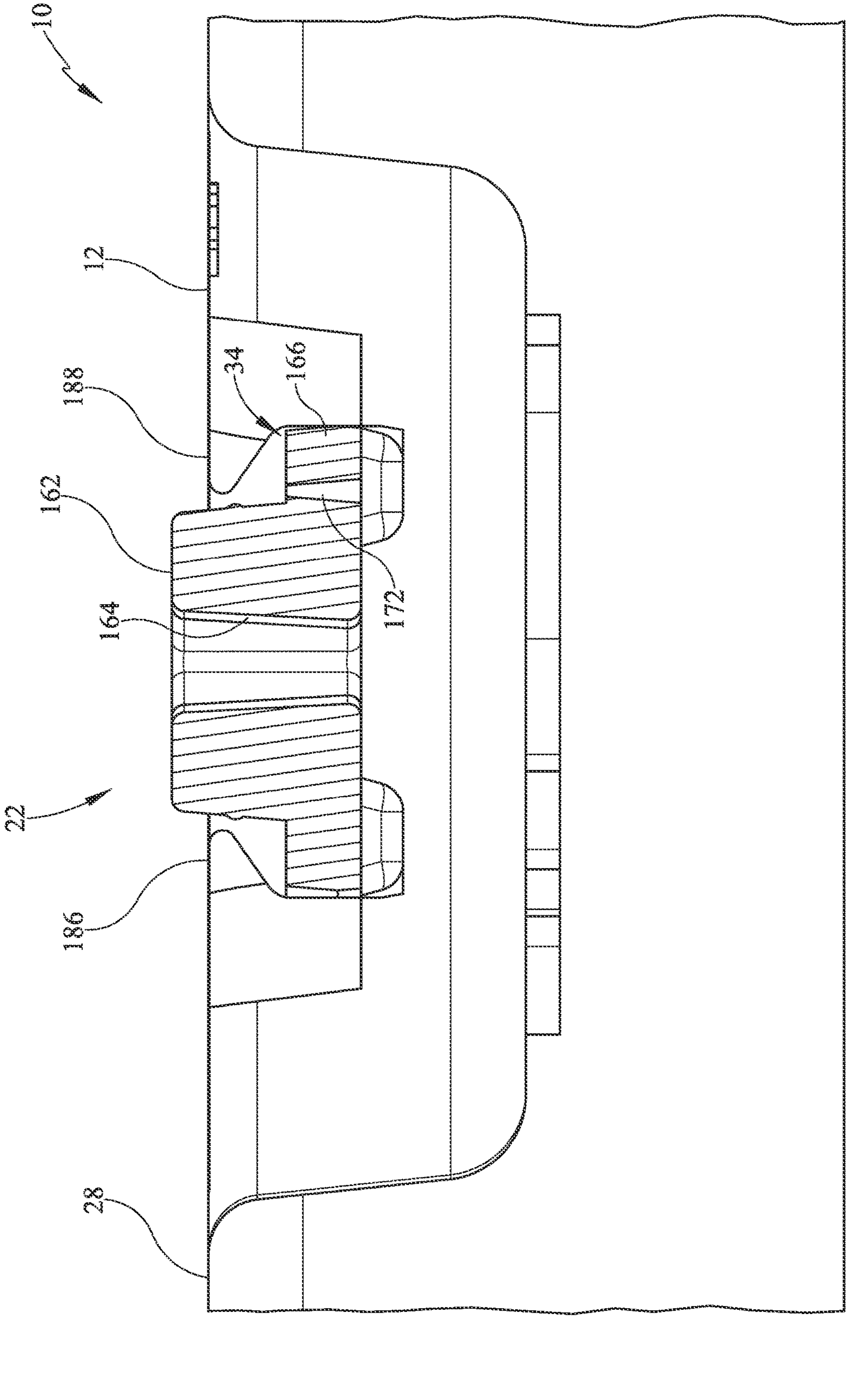
FIG. 11 is a cross-sectional view taken through lines 11-11 of FIG. 10.

It will therefore be appreciated that, when retaining key 34 moves between the locked and released configurations, retaining car 166 moves through channel 184. FIGS. 10-11, for example, illustrate an intermediate configuration of retaining key 34 where retaining ear 166 is disposed within channel 184. As with retaining key 30, retaining key 34 also includes a relief slot 172 adjacent retaining ear 166 such that retaining car 166 is allowed to deflect inwardly and compress relief slot 172 when disposed within channel 184. In addition, the amount of deflection may vary based upon the separation between walls 186, 188 thereby providing more consistent frictional resistance over a wider range of wall 186, 188 separations. In addition, as with retaining key 30, retaining key 34 may include different numbers and arrangements of retaining ears and/or relief slots, so the invention is not limited to the particular configurations illustrated herein.

In addition, it will be appreciated that container body 12 may include various features to facilitate the usage of a retaining key such as retaining key 34. As shown in FIG. 1, for example, a pocket 190 may be disposed adjacent to retaining key 34 such that a user is able to transition retaining key 34 using a "pinching" motion between a finger and the thumb, with one of the finger and the thumb engaging the wall of pocket 190 proximate retaining key 34 and the other engaging raised portion 162 of tab portion 146 proximate end 58 thereof. In addition, in some embodiments, a wedge lock 192 may be defined on a bottom wall of a release void (e.g., as illustrated for retaining key 32) to provide an initial resistance to transition of a retaining key from the locked configuration to the released configuration. Release void 178 may also be dimensioned along the direction of the longitudinal axis of a retaining key in some embodiments to inhibit full removal of a retaining key from a key support after installation.

It will also be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A package for a product, comprising:

a container body configured to support the product and including a key support, the key support including first and second walls defining a channel; and a retaining key supported by the key support and extending through the channel, wherein the retaining key is configured for movement along a longitudinal axis between locked and released configurations, wherein in the locked configuration the retaining key retains a portion of the product when the product is supported by the container body and in the released configuration the retaining key is retracted to facilitate removal of the product from the container body when the product is supported thereby, wherein the retaining key includes:

a retaining ear extending generally transverse to the longitudinal axis and configured to frictionally engage the first wall of the key support within the channel during at least a portion of the movement of the retaining key between the locked and released configurations; and a closed relief slot formed in the retaining key adjacent to the retaining ear and configured to enable flexure of the retaining ear during the at least a portion of the movement of the retaining key between the locked and released configurations.

2. The package of claim 1, wherein the retaining key includes a tab portion including first and second ends and the retaining ear is disposed on the tab portion intermediate the first and second ends thereof, and wherein the first end of the tab portion is configured to extend over the portion of the product when the retaining key is in the locked configuration.

3. The package of claim 2, wherein the retaining key further includes an anchor portion and a deformable portion extending between the tab portion and the anchor portion, wherein the deformable portion is configured to be suspended over a void defined by the key support when the retaining key is supported by the key support, wherein the anchor portion is configured to anchor the retaining key to the key support, and wherein depression of the deformable portion into the void moves the retaining key from the locked configuration to the released configuration.

4. The package of claim 2, wherein the retaining ear is a first retaining ear, wherein the tab portion further includes a second retaining ear disposed proximate the second end of the tab portion, and wherein the first and second retaining ears are separated from one another in a direction parallel to the longitudinal axis by a distance that is greater than a length of the channel in the direction parallel to the longitudinal axis such that the first and second retaining ears are disposed external to the channel and on opposite sides thereof when the retaining key is in the locked configuration.

5. The package of claim 1, wherein the key support is integrally-formed with the container body.

6. The package of claim 5, wherein the container body and key support are formed of a thermoformed plastic.

7. The package of claim 1, wherein the closed relief slot includes a substantially linear portion extending substantially parallel to the longitudinal axis of the retaining key.

8. The package of claim 1, wherein the closed relief slot has a length in a direction extending substantially parallel to the longitudinal axis of the retaining key that is longer than that of the retaining ear.

9. The package of claim 1, wherein the retaining ear includes first and second inclined faces respectively configured to engage first and second ends of the first wall proximate first and second ends of the channel when the retaining key is urged toward the locked and released configurations.

10. The package of claim 1, wherein the container body includes a pocket positioned adjacent to the key support to receive a finger or thumb of a user to allow for movement of the retaining key between the locked and released configurations through a pinching motion by the user.

11. A key retention system for retaining a product, comprising:

a key support including first and second walls defining a channel; and a retaining key supported by the key support and extending through the channel, wherein the retaining key is configured for movement along a longitudinal axis between locked and released configurations, wherein in the locked configuration the retaining key retains a portion of the product when the product is supported by the container body and in the released configuration the retaining key is retracted to facilitate removal of the product from the container body when the product is supported thereby, wherein the retaining key includes:

a retaining ear extending generally transverse to the longitudinal axis and configured to frictionally engage the first wall of the key support within the channel during at least a portion of the movement of the retaining key between the locked and released configurations; and a closed relief slot formed in the retaining key adjacent to the retaining ear and configured to enable flexure of the retaining ear during the at least a portion of the movement of the retaining key between the locked and released configurations.

12. The key retention system of claim 11, wherein the retaining key includes a tab portion including first and second ends and the retaining ear is disposed on the tab portion intermediate the first and second ends thereof, and wherein the first end of the tab portion is configured to extend over the portion of the product when the retaining key is in the locked configuration.

13. The key retention system of claim 12, wherein the retaining key further includes an anchor portion and a deformable portion extending between the tab portion and the anchor portion, wherein the deformable portion is configured to be suspended over a void defined by the key support when the retaining key is supported by the key support, wherein the anchor portion is configured to anchor the retaining key to the key support, and wherein depression of the deformable portion into the void moves the retaining key from the locked configuration to the released configuration.

14. The key retention system of claim 12, wherein the retaining ear is a first retaining ear, wherein the tab portion further includes a second retaining ear disposed proximate the second end of the tab portion, and wherein the first and second retaining ears are separated from one another in a direction parallel to the longitudinal axis by a distance that is greater than a length of the channel in the direction parallel to the longitudinal axis such that the first and second retaining ears are disposed external to the channel and on opposite sides thereof when the retaining key is in the locked configuration.

15. The key retention system of claim 11, wherein the closed relief slot includes a substantially linear portion extending substantially parallel to the longitudinal axis of the retaining key.

16. The key retention system of claim 11, wherein the closed relief slot has a length in a direction extending substantially parallel to the longitudinal axis of the retaining key that is longer than that of the retaining ear.

17. The key retention system of claim 11, wherein the retaining ear includes first and second inclined faces respectively configured to engage first and second ends of the first wall proximate first and second ends of the channel when the retaining key is urged toward the locked and released configurations.

18. A retaining key for use in a key retention system for retaining a product in a container body, the key retention system of a type that includes a key support including first and second walls defining a channel, the retaining key configured to be supported by the key support and extend through the channel for movement along a longitudinal axis between locked and released configurations, wherein in the locked configuration the retaining key retains a portion of the product when the product is supported by the container body and in the released configuration the retaining key is retracted to facilitate removal of the product from the container body when the product is supported thereby, the retaining key comprising:

a retaining ear extending generally transverse to the longitudinal axis and configured to frictionally engage the first wall of the key support within the channel during at least a portion of the movement of the retaining key between the locked and released configurations; and a closed relief slot formed in the retaining key adjacent to the retaining ear and configured to enable flexure of the retaining ear during the at least a portion of the movement of the retaining key between the locked and released configurations.

19. The retaining key of claim 18, wherein the closed relief slot includes a substantially linear portion extending substantially parallel to the longitudinal axis of the retaining key.

20. The retaining key of claim 18, wherein the closed relief slot has a length in a direction extending substantially parallel to the longitudinal axis of the retaining key that is longer than that of the retaining ear.

* * * * *